United States Patent [19]

Holden

[11] Patent Number: 4,482,948
[45] Date of Patent: Nov. 13, 1984

[54] MICROPROCESSOR BUS INTERCHANGE CIRCUIT

[75] Inventor: James R. Holden, Chicago, Ill.

[73] Assignee: GTE Automatic Electric Labs Inc., Northlake, Ill.

[21] Appl. No.: 220,936

[22] Filed: Dec. 29, 1980

[51] Int. Cl.³ ............................................. G06F 13/00
[52] U.S. Cl. .................................................... 364/200
[58] Field of Search ................................ 364/200, 900

[56] References Cited
U.S. PATENT DOCUMENTS
4,180,855 12/1979 Buedel .............................. 364/200

Primary Examiner—Thomas M. Heckler
Assistant Examiner—Tim A. Wiens
Attorney, Agent, or Firm—Gregory G. Hendricks; Robert J. Black

[57] ABSTRACT

A bus interchange circuit for use with a microprocessor. Timing, gating, sequencing and storage circuitry provide an interface between a microprocessor and external systems requesting control of the microprocessor's busses.

8 Claims, 1 Drawing Figure

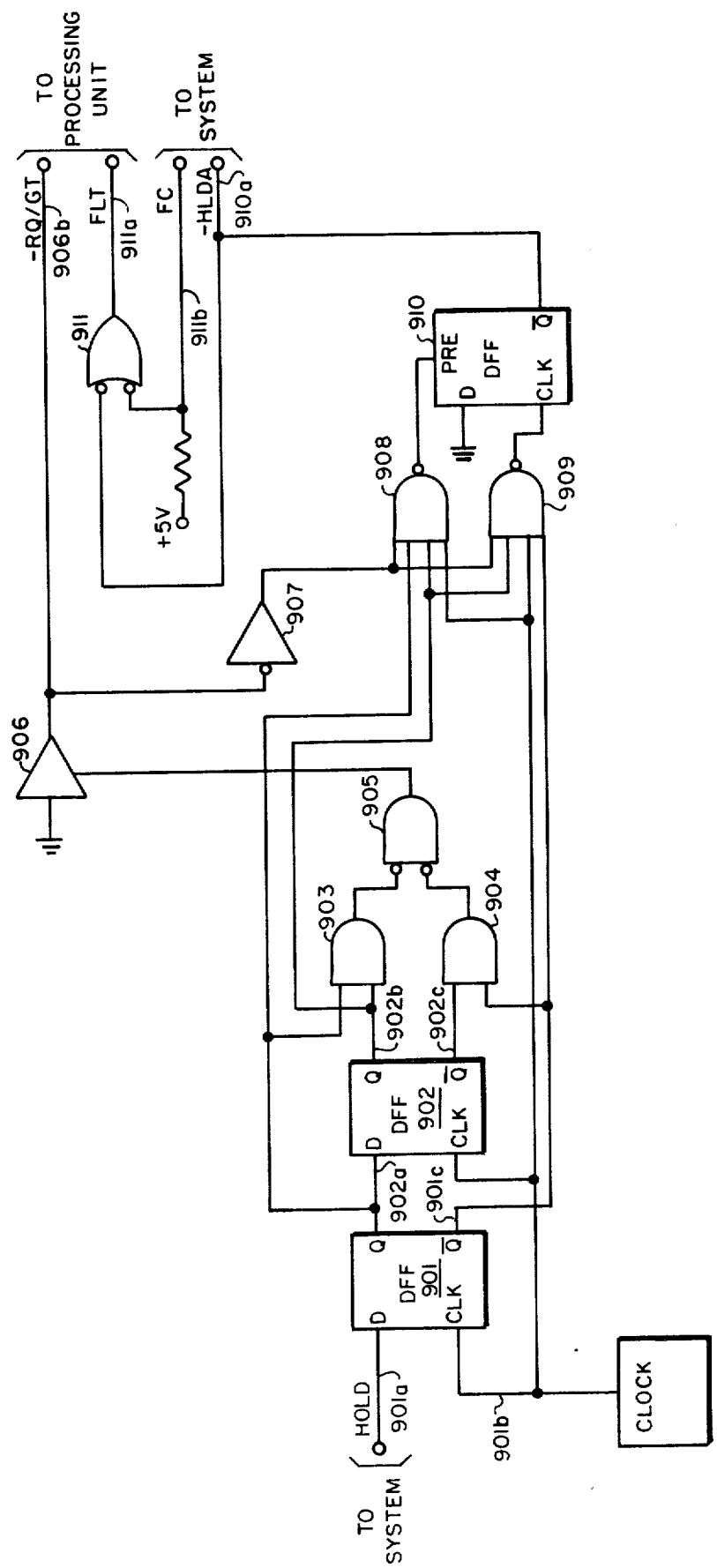

MICROPROCESSOR BUS INTERCHANGE CIRCUIT

BACKGROUND OF THE INVENTION

1. Field of the Invention

The present invention relates to a microprocessor system and more particularly to a bus interchange circuit which allows external systems to gain control of a microprocessor's busses.

2. Description of the Prior Art

Older microprocessors, such as Intel's 8-bit 8080A and 8085A provide bus interchange functions such as hold request and hold acknowledge. These functions are not available in current state-of-the-art microprocessors, such as Intel's 8086. These microprocessors however, do have a control lead for use by co-processors, such as Intel's 8089 Input-Output Processor and Intel's 8087 Numeric Data Processor. This lead can also be used as a bus interchange "handshake" control lead by emulating the pulse sequences produced by the co-processors. Thus, hold request and hold acknowledge functions, can be provided by state-of-the-art microprocessors through use of a circuit which emulates the "handshake" operation of a co-processor.

Accordingly it is the object of the present invention to provide a bus interchange "handshake" control circuit for use with a state-of-the-art microprocessor.

SUMMARY OF THE INVENTION

The present invention is a circuit which converts the co-processor control lead of a microprocessor into a bus interchange "handshake" lead. This circuit performs the "handshake" function through emulation of a co-processor.

A two-bit counter and an associated decoder are used to generate pulses in response to an external microprocessor access request and termination of such request. A tri-state gate is used to interface with the microprocessor. Gating circuits and an associated flip-flop are used to generate an acknowledge signal upon detection of a signal from the microprocessor indicating that the access request has been granted. This acknowledge signal informs the external system that it has gained control of the microprocessor's busses and it also commands the microprocessor to "float" its bus control leads.

DESCRIPTION OF THE DRAWING

The single FIGURE of the accompanying drawing is a logic diagram of a microprocessor bus interchange circuit in accordance with the present invention.

DESCRIPTION OF THE PREFERRED EMBODIMENT

Referring now to the accompanying drawing, the microprocessor bus interchange circuit of the present invention is shown. When an external system requests access to the memories of the system of the present invention it places a logic level 1 hold signal on lead 901a. During the next clock pulse this logic level 1 signal is transferred to the Q output of D-type flip-flop 901. This logic level 1 signal then appears at the D input of D-type flip-flop 902 on lead 902a. At the next successive clock pulse flip-flop 902 transfers this logic level one signal to its Q output and it appears on lead 902b. Thus D-type flip-flops 901 and 902 act as a 2-bit shift register. After flip-flop 901 has clocked in a logic 1 signal to its Q output in response to a hold signal, flip-flop 901 has a logic level 1 on its Q output and flip-flop 902 has a logic 0 on its Q output. Similarly flip-flop 901 will have a logic 0 on its $\overline{Q}$ output and flip-flop 902 will have a logic 1 on its $\overline{Q}$ output. Gates 903 and 904 each generates a logic level 0 signal in response to these conditions and gate 905 accordingly generates a logic level 1 signal which turns on tri-state gate 906. When this gate is turned on it places a logic level 0 signal on lead 906b which represents an access request signal to the processing units.

This request signal remains applied until the next clock pulse which causes D-type flip-flop 902 to transfer the logic level 1 signal on its D input to its Q output. In this situation gate 903 generates a logic level 1 signal in response to a logic level 1 on both of its inputs. This causes gate 905 to generate a logic level 0 signal thereby turning off tri-state gate 906 and when this gate is turned off it removes the request signal by placing a logic level 1 signal on lead 906b. Thus the request signal is a pulse having the same duration as one clock cycle.

When the processing unit has determined that it can release control of its buses and memory it applies a logic level 0 grant signal on lead 906b. This logic level 0 signal is inverted to a logic level 1 signal by inverter 907 and applied to gate 908. Since the Q outputs of both flip-flops 901 and 902 are also at a logic level 1, when the next clock pulse appears gate 908 generates a logic level 0 signal on the pre-set input of D-type flip-flop 910 thereby causing a logic level 0 hold acknowledge signal to appear on lead 910a. This signal is used to inform the external system that it now has control of the internal buses and memory. Gate 911 also responds to the hold acknowledge signal to generate a float signal which is used by the processing units to float the buses and control signals. Gate 911 also generates this float signal in response to a float command on lead 911b from the external system.

When the external system is ready to release control of the processing units it removes the hold signal from lead 901a. During the next clock pulse on lead 901b D-type flip-flop 901 transfers the logic 0 signal on lead 901a to its Q output and places a logic level 1 signal on its $\overline{Q}$ output. Consequently gates 903 and 904 again generate logic level 0 signals causing a logic level 1 signal on the output of gate 905 thereby turning on tri-state gate 906 and applying a second logic level 0 request signal on lead 906b.

This second request signal also has a duration equal to the period of one clock cycle. This request signal informs the processing unit that it can regain control of its buses and memory. Since flip-flop 901 is reset and flip-flop 902 is set gate 909 generates a logic level 0 signal at the next clock pulse thereby clocking a logic level 1 signal onto the output of flip-flop 910. Thus the hold acknowledge signal is removed and the external system is informed that the processing unit has regained control of its buses and memory.

It will be obvious to those skilled in the art that numerous modifications of the present invention can be made without departing from the spirit of the invention which shall be limited only by the scope of the claims appended hereto.

What is claimed is:

1. A bus interchange circuit for use with a primary processing unit, and a secondary processing unit, said secondary processing unit operated to generate an access request signal, said bus interchange circuit comprising:

first detection means including a source of clock pulses and a shift register having a plurality of bit registers, each connected to said source of clock pulses, a first one of said bit registers being connected to said secondary processing unit, said shift register being operated in response to said clock pulses to sequentially clock the status of said access request signal through said shift register, whereby a first predetermined pattern of said shift register bits represents an access request detected signal of predetermined duration;

gating means connected to said first detection means, operated in response to said access request detected signal to generate an access request interrupt signal of predetermined duration;

said primary processor, connected to said gating means, operated in response to said access request interrupt signal to generate a grant signal; and second detection means connected to said primary processor, operated in response to said grant signal to generate an access request acknowledge signal;

said shift register further operated in response to removal of said access request signal to provide a second predetermined pattern of shift register bits which represent an access removal detected signal of predetermined duration;

said gating means further operated in response to said access removal detected signal to generate an access complete interrupt signal; and said second detection means further connected to said first duration means and further operated in response to said access removal detected signal to terminate said access request acknowledge signal.

2. The circuit of claim 1, wherein said primary processor is further operated to generate address, data and control signals; said second detection means further operated in response to said grant signal to generate a float signal; and said primary processor further operated in response to said float signal to disable said address, data and control signals.

3. The circuit of claim 2, wherein said secondary primary processing unit is further operated to generate a float command; said second detection means further operated in response to said float command to generate said float signal.

4. The circuit of claim 1, wherein said gating means comprises: a first decoder and a tri-state gate connected to said decoder.

5. The circuit of claim 1 wherein said second detection means comprises: a second decoder connected to said primary processing unit and said shift register, operated in response to said grant signal to generate a preset signal;

said second decoder further operated in response to said grant signal, and said second predetermined pattern of said shift register bits to generate a reset signal; and a register connected to said second decoder, operated in response to said preset signal to generate said access request acknowledge signal, and further operated in response to said reset signal to terminate said access request acknowledge signal.

6. The circuit of claim 1 wherein said shift register comprises a plurality of D-type flip-flops.

7. The circuit of claim 5, wherein said register comprises a D-type flip-flop.

8. The circuit of claim 5, wherein there is further included: second gating means connected between said register and said primary processing unit, operated in response to said access request acknowledge signal to generate a primary processing unit bus float signal.

* * * * *